United States Patent [19]

Brunner

[11] Patent Number: 5,017,761

[45] Date of Patent: May 21, 1991

[54] FIBER-OPTIC HEATER PROBE ASSEMBLY FOR HEAT TREATING METALLIC CONDUITS

[75] Inventor: Michael G. Brunner, Wilkins Township, Allegheny County, Pa.

[73] Assignee: Westinghouse Electric Corp., Pittsburgh, Pa.

[21] Appl. No.: 298,442

[22] Filed: Jan. 18, 1989

[51] Int. Cl.$^5$ .............................................. H05B 1/02
[52] U.S. Cl. .................................... 219/502; 219/851; 219/494; 374/121; 374/131
[58] Field of Search ............... 219/502, 497, 499, 505, 219/494, 85.1, 60.2; 374/18, 121, 130, 131

[56] References Cited

U.S. PATENT DOCUMENTS

| | | | |
|---|---|---|---|
| 4,273,127 | 6/1981 | Auth et al. | 219/121.6 |
| 4,484,059 | 11/1984 | Lillquist | 219/124.34 |
| 4,700,040 | 10/1987 | Diggers | 219/85 R |
| 4,944,826 | 7/1990 | Zollman et al. | 219/121.8 |

Primary Examiner—M. H. Paschall

[57] ABSTRACT

A heater probe assembly used to heat treat a portion of a metallic tube that is surrounded by a heat sink is disclosed. The heater probe assembly heats the tube to a selected temperature range to relieve stress in and prevent degradation of the tube portion. The heater probe assembly includes an elongated probe body that is insertable and slidably movable within the tube portion. A radiant heat source is removably mounted on the probe body and heats the tube portion to incandescence within the selected temperature range. A temperature monitoring device monitors the temperature of the tube portion. The temperature monitoring device includes first and second optical measuring devices which determine the color of the tube portion at its longitudinally middle and end portions of the tube portion. An optical pyrometer translates the optical color measurement into a temperature measurement. A fiber-optic cable connects the first and second optical measuring device to first and second prisms which conducts the light of incandescence of the heated tube portion to the temperature monitoring device. A probe sleeve is mounted on the probe body and prevents light from the heat source from reflecting in to the prisms. An eddy current sensing device properly locates the heater probe assembly within the tube.

22 Claims, 2 Drawing Sheets

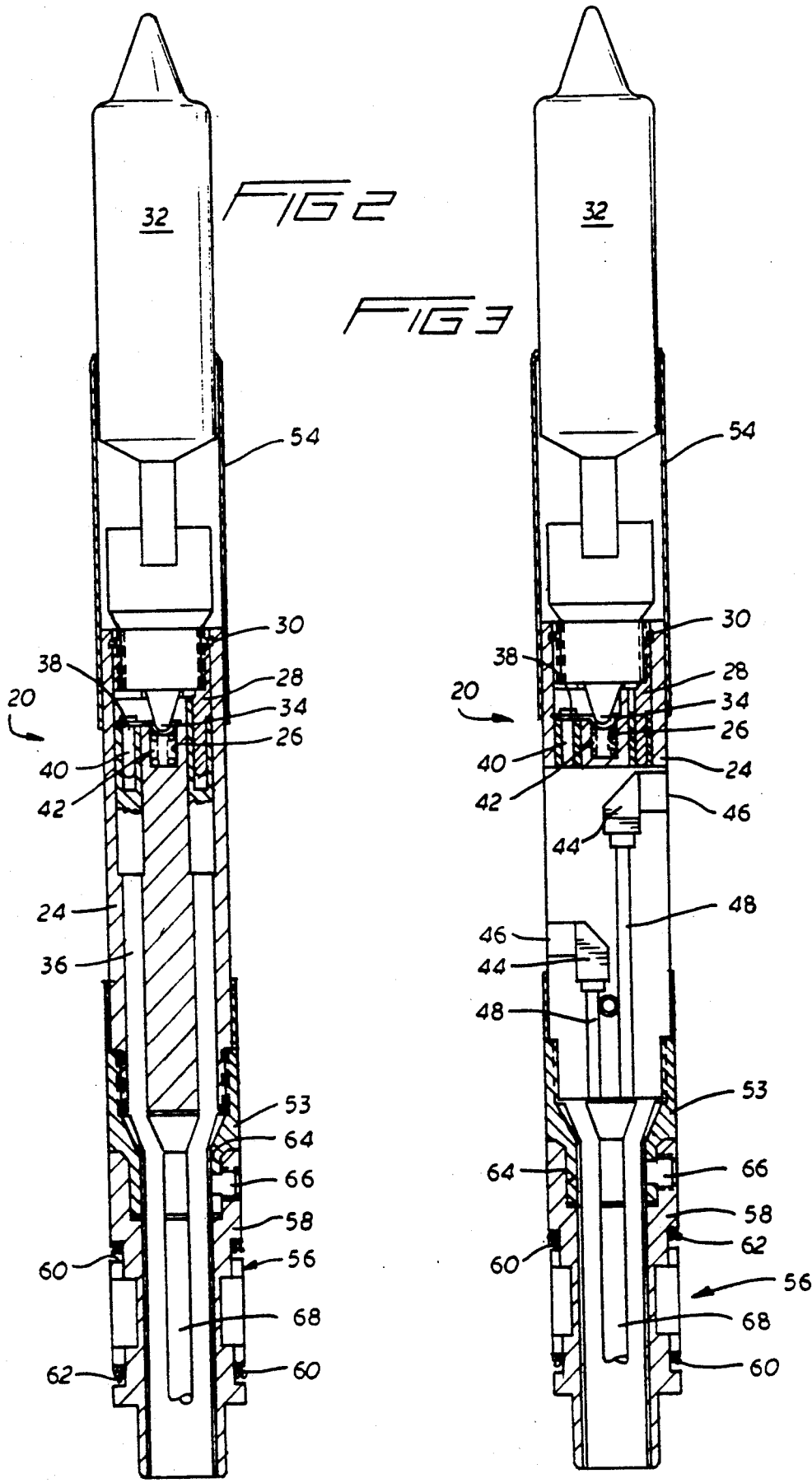

FIBER-OPTIC HEATER PROBE ASSEMBLY FOR HEAT TREATING METALLIC CONDUITS

TECHNICAL FIELD

The present invention generally relates to a device for thermally stress-relieving a metallic conduit that is surrounded in part by a heat sink, such as a section of an Inconel ® heat exchanger tube that is surrounded by a support plate in a nuclear steam generator. More particularly, the present invention is directed to a fiber-optic heater probe assembly having an improved temperature monitoring ability for heat treating a heat exchanger tube in a steam generator.

BACKGROUND OF THE INVENTION

Devices and processes for heat treating the heat exchanger tubes of nuclear steam generators are known in the the art. Generally, the purpose of these devices and processes is to relieve the tensile stresses that occur in certain portions of these tubes which in turn can result in a phenomenon known as "stress corrosion cracking." However, before the importance of these stress-relieving devices and processes can be fully appreciated, some understanding of the structure and operation of nuclear steam generators is necessary.

Nuclear steam generators are formed from three principal components, including a primary side which circulates water heated from a nuclear reactor, a secondary side, and a tube-sheet which hydraulically separates the primary and secondary sides. The secondary side of the generator contains a plurality of U-shaped heat exchanger tubes and an inlet for admitting a flow of feedwater. The inlet and outlet ends of the U-shaped tubes are mounted in the tubesheet. The primary side includes a divider sheet which hydraulically isolates the inlet ends from the outlet ends of the U-shaped tubes. Hot, radioactive water flowing from the nuclear reactor is admitted into the section of the primary side containing the inlet ends of the U-shaped tubes. This hot, radioactive water flows through the inlets, through the tubesheet, and circulates around the U-shaped tubes which extend within the secondary side of the generator. This water transfers its heat through the walls of the U-shaped tubes to the nonradioactive feedwater flowing through the secondary side of the generator, thereby converting this feedwater to nonradioactive steam which powers the turbines of an electric generator. After the primary side water from the reactor circulates through the U-shaped tubes, it flows back through the tubesheet, through the outlets of the U-shaped tubes, and into the outlet section of the primary side, where it is recirculated back to the nuclear reactor.

Chronic maintenance problems arise in such generators as a result of tensile stresses induced in the walls of the heat exchanger tubes. These tensile stresses may in turn cause the tubes to corrode and to crack as a result of lead to an undesirable "stress corrosion cracking" if the stress is not relieved. The resulting cracks in the tubes can cause the heat exchanger tubes to leak radioactive water from the primary side into the secondary side of the generator, thereby radioactively contaminating the steam produced by the steam generator. Such tensile stresses may occur from either manufacturing or maintenance operations. For example, stress-causing bends are incorporated into the heat exchanger tubes during their manufacture to create their U shape. Stress-causing expansions are routinely induced in various sections of the heat exchanger tubes in the tubesheet and support plate regions, both during the manufacture and maintenance of the generator. Also, stress-causing welds may be placed around the interior walls of the tubes whenever reinforcing sleeves are welded therein. Other tensile stresses occur from the accumulation of sludge deposits in the crevice regions of the generator, such as the annular region between the heat exchanger tubes and the bores in the tube support plates through which the tubes extend. Such deposits can accumulate in these annular regions and expand to such an extent that the tube becomes dented into an ovular cross section in the support plate region. This is known as radial tube denting. A detailed discussion of radial tube denting and maintenance expansions designed to prevent them can be found in U.S. Pat. No. 4,649,492 by Sinha et al., assigned to the Westinghouse Electric Corporation, the entire specification of which is incorporated herein by reference.

In order to prevent corrosion and tube cracking from occurring in the heat exchanger tubes of the generator, both mechanical and thermal stress-relieving processes have been developed. One of the most successful thermal stress-relieving processes is disclosed in U.S. patent application Ser. No. 24,941 filed Mar. 13, 1987 and entitled "Process for Thermally Stress Relieving a Tube" by Bevilacqua et al., assigned to the Westinghouse Electric Corporation, the entire specification of which is incorporated herein by reference. This process provides results in an extremely fast yet reliable process for stress relieving Inconel ® heat exchanger tubes which have had tensile stresses induced therein by bending, denting, tube expansions, or sleeve weldings.

Unfortunately, this particular process is very difficult to implement along tube sections having non-homogeneous thermal conductivity characteristics, such as the sections of the heat exchanger tubes that are surrounded by tube support plates. The sections of the tubes that extend through the tube support plates often need to be stress relieved either as a result of a deliberate tube expansion in this area, or radial tube denting. However, if one attempts to thermally stress-relieve the section of the tube extending through and in contact with such support plates using the '941 method with a stationary heater assembly that is at least as long as the tube section to be heat treated, one of two unsatisfactory results follow. Either the portion of the tube directly in contact with the tube support plate is underheated due to the heat sink properties of the plate, or, if the power of the heater assembly is increased to adequately heat the plate-contacting portion of the tube, the sections of the tube above and below the plate are overheated (i.e., heated to over 1500° F.). Overheating can cause carbides to precipitate in the grain boundaries of the Inconel ® that forms the tube, which renders these portions of the tube brittle and more susceptible to stress-corrosion cracking, thereby defeating the purpose of the thermal stress relief.

U.S. patent application Ser. No. 069,721 filed June 6, 1987 and entitled "Process for Heat Treating a Heat Exchanger Tube Surrounded by a Support Plate" by Cheng and assigned to Westinghouse Electric Corporation (the entire specification of which is incorporated herein by reference), discloses an improved method for thermally stress-relieving a tube which is capable of creating and maintaining a substantially uniform heat gradient across a section of a metallic tube that is characterized by non-homogeneous thermal-loss properties. This improved process is implemented by oscillating a heater assembly in the tube section being treated in accordance with a selected amplitude and period so that the tube section is substantially uniformly heated to the desired heat treatment temperature.

The heater apparatus that implements this process includes a heater probe, a fiberoptic cable connected to a pyrometer, and a probe positioning device. The fiberoptic cable is used to conduct the light of incandescence emanating from the heated tube to the pyrometer. While this heater assembly is capable of heating the tube walls sufficiently to relieve stresses, the inventors have observed that the accuracy of the temperature monitoring instrumentalities in these prior art devices which could bear improvement. Specifically, the applicants have noted that the heat and light emanating from the radiant heating element of the heater probe can sometimes cause the pyrometer to register a temperature reading that is inaccurately high or low, thus creating the possibility that a tube may be underheated or overheated. Another drawback associated with the temperature monitoring instruments used in these probes is that they have only one fiber-optic cable for transmitting the light of incandescence to the pyrometer. Hence these probes can monitor the temperature of the tubes they heat at only one point at one time. Because of the non-uniformities of the heat gradient caused by the heat sink properties of the support plates that surround the tubes, such one-point monitoring can result in an inaccurate temperature reading. To ensure accurate temperature monitoring, the applicants have found that it is important to measure temperature at more than one location in the region of the tube being heated.

Finally, the inventors have noted that problems can arise in the fiber-optic cable that receives the light emanating from the heated tube in these prior art probes. The end of the fiber-optic cable mounted in the heater probe is polished at a 45° angle to receive the light and to reflect it down the axis of the cable to the pyrometer. Where such 45° polishing is used, the fiber-optic cable is mounted deep within the ceramic body of the probe in order to prevent the cable from being over-heated, and a light-collimating port is provided in the ceramic body to conduct light to the 45° polished end. Unfortunately, this arrangement significantly interferes with the conduction of light from the heated tube to the body of the cable. Additionally, this arrangement requires that the fiber-optic cable be assembled in the heater probe as two pieces. One segment is long and runs from the pyrometer to the ceramic body. The other segment, which included the polished 45° surface, is short and extends from the end of the long segment to the port or window in the probe body. The short segment of fiber-optic cable causes significant interference with the conduction of light from the heated tube to the long segment of cable, resulting in numerous additional problems. The outer surface of the fiber-optic cable which faces the tube wall is curved, detracting from optimum light passage. Moreover, it is difficult to position precisely the short segment of fiber-optic cable which tends to rotate and move out of its proper position easily. This reduces the effectiveness of the probe as the 45° surface requires an exact, precise alignment facing the tube wall. The gap created between the two segments of the fiber-optic cables also interferes with the light passage. Finally, the small diameter of fiber-optic cable severely restricts the amount of light conducted through the cable. The effective window area for the cable is only 0.039 inch high by 0.039 inch across a round surface.

To enhance the conduction of light from the heated tube to the end of the cable, the inventors tried to mount the cable within the probe body in a 20° bend to minimize the distance between the polished end of the cable and the wall of the heated tube. However, such bending introduced stresses in the cable which rendered it very fragile. Additionally, polishing the end of 35 the cable at a 20° angle proved difficult and expensive, which increased the cost of properly machining the fiber-optic cable.

Clearly, there is a need for a heater probe that is capable of accurately monitoring the temperature of the tube being heated at a plurality of points by means of a fiber-optic configuration which is both durable and sensitive.

SUMMARY OF THE INVENTION

The present invention overcomes the disadvantages of prior heater assemblies by means of a heater probe having an elongated probe body that includes two fiber-optic cables spaced along its longitudinal axis. The elongated probe body is insertable and slidably movable within the portion of the tube being treated, and has first and second ends. A radiant heat source such as an incandescent high intensity light bulb is removably mounted at the first end of the probe body and heats the tube portion to incandescence within the selected temperature range. The second end of the probe body is connected to a push rod. The two fiber-optic cables in the probe body are axially spaced apart a distance substantially equal to half the length of the axial tube portion being heated to measure simultaneously the tube temperature at locations corresponding to the middle and one edge of the heated tube portion. The heater probe also includes a probe sleeve which shields the ends of the fiber-optic cables from direct heat and light from the heat source. The sleeve also reinforces the mechanical connection between the heat source of the probe (which is typically an incandescent bulb), and the ceramic probe body.

Most importantly, the present invention uses a quartz prism disposed within the probe body adjacent to the light receiving end of the fiber-optic cables. The prisms can be easily formed with a 45° face, thereby obviating the need to form a 45° face on the cables themselves. The prisms extend the life of the heater probe by almost an order of magnitude by preventing mechanical wear on the delicate ends of the fiber-optic cables. The prisms also act as a heat shield, protecting the ends of the fiber-optic cables from the heat of incandescence of the tube. Moreover, the prism design has a flat surface facing the tube wall to provide a superior light passage. The prism itself is securely fixed in place in the probe body by the geometry of the body and the prism does not move out of position. One continuous length of fiber-optic cable may be used, thereby eliminating interference problems at cable segment junctions. Also, the effective prism window for conducting light is 0.185 inch high by 0.125 inch across a flat surface. This is 15 times greater than the area of the light receiving end of the fiberoptic cable used heretofore.

A temperature monitoring device monitors the temperature of the tube portion. The temperature monitoring device includes first and second optical measuring devices which determine the color of the tube portion at its middle and end portions, respectively. The middle and end portions are defined by the middle and end portions of the metallic tube support plate surrounding the tube portion. An optical pyrometer translates the optical color measurement into a temperature measurement, and a fiber-optic cable connects the first and second optical measuring device to the first and second prisms. The prisms each have a substantially 45° face, which conducts the light of incandescence of the heated tube portion to the temperature monitoring device. The first and second prisms are spaced along the longitudinal axis of the probe body such that the first and second prisms can simultaneously receive the light of incandescence from the middle and end portions of the tube portion. First and second eddy current sensing coils are mounted around the probe body to sense the opposing edges of the metallic tube support plate surrounding the tube portion. The coils are spaced along the longitudinal axis of the probe body at a distance substantially equal to the distance between the opposing edges of the metallic tube support plate. Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE SEVERAL FIGURES

FIG. 1 is a partial cross-sectional view of a steam generator showing only one heat exchanger tube with the heater probe assembly of the present invention inserted into the tube, FIG. 2 is a cross-sectional view of the heater probe assembly with the temperature measurement system removed, and FIG. 3 is a cross-sectional view of the heater probe assembly of FIG. 2 showing the essential elements of the temperature measurement system.

DETAILED DESCRIPTION OF PREFERRED EMBODIMENTS

Figure 1:
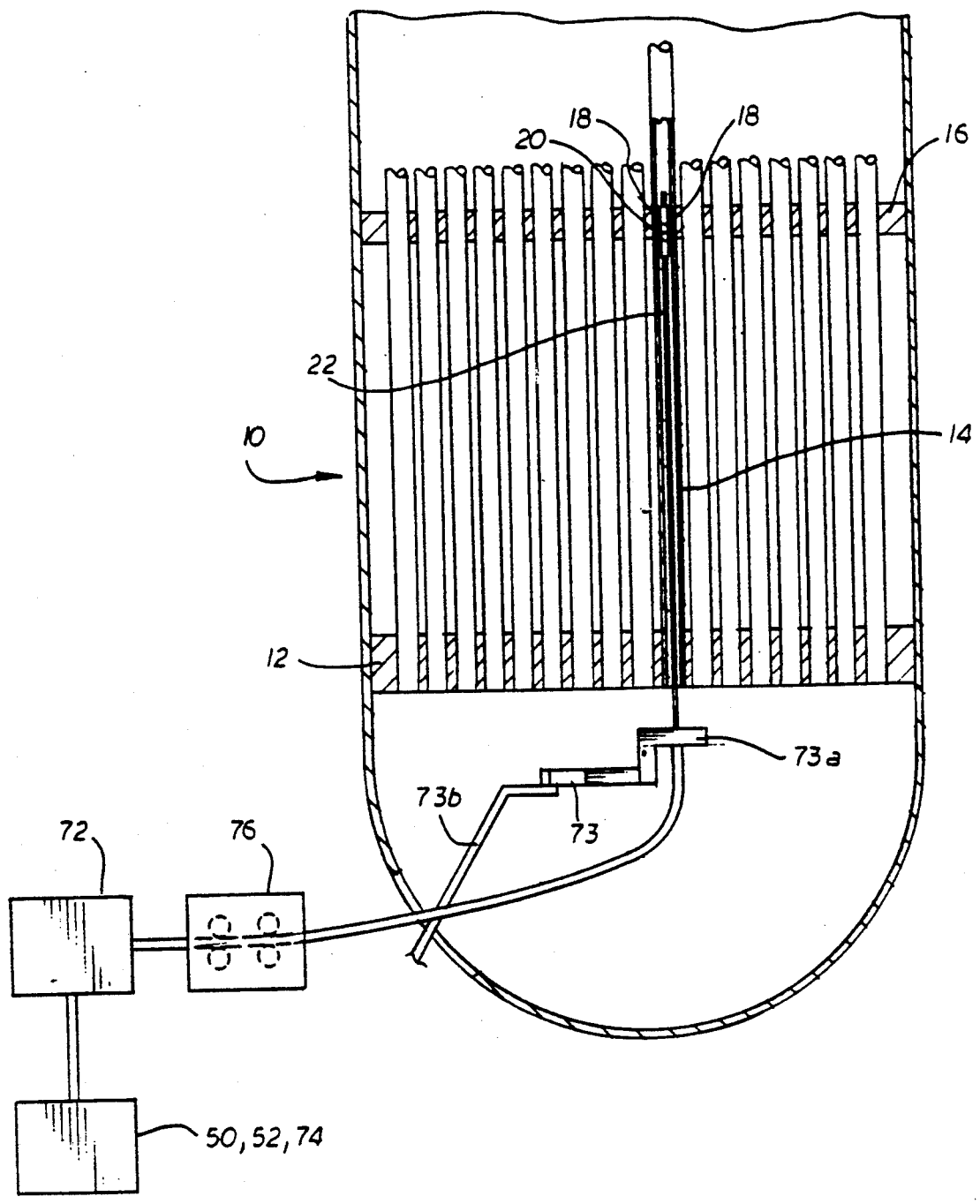

FIG. 1 illustrates a steam generator 10 having a tubesheet 12 which divides the generator into primary and secondary sides. One heat exchanger tube 14 of the generator is shown. Tube 14 is supported by a plurality of tube support plates 16, one of which is shown in FIG. 1. Due to the operation of the steam generator, stress area 18 develops in tube 14 at the location corresponding to tube support plate 16. To relieve this stress, heater probe assembly 20 is inserted into tube 14 to thermally treat stress area 18. Heater probe assembly 20 is approximately 50 feet long, most of that length being plastic conduit tube 22.

FIG. 2 illustrates the details of heater probe assembly 20. Heater probe assembly 20 includes probe body 24 which is preferably fabricated using Vespel SP-1 material, a high-temperature plastic with very good electrical and thermal insulating properties. Counterbore 26 is formed at the top of probe body 24. Lamp socket 28, made of copper and plated with nickel and silver, is secured in counterbore 26 by retaining ring 30 placed above the socket. Lamp socket 28 is restricted from rotating within counterbore 26 by a small tab (not shown) on the bottom of the socket which sits in a circular slot cut-out in probe body 24. Light bulb 32, having lamp contact piece 34, is threaded into lamp socket 28. Light bulb 32 is preferably a 1000 watt tungsten halogen lamp, such as Sylvania model 1000-Q13CL tungsten halogen lamp having a 16 coil tungsten filament. Probe body 24 preferably has an outer diameter closely dimensioned to the inner diameter of tube 14. This permits probe body 24 to concentrically center the filament of light bulb 32 along the longitudinal axis of tube 14 to ensure uniform heating of the tube.

Power is supplied to light bulb 32 by two high-temperature wires 36 which run the length of probe body 24. A socket contact 38 is mounted on the end of each wire 36 adjacent light bulb 32 via contact pin 40 which is fastened to the bottom of the base of lamp socket 26. Contact pin 40 is soldered to socket contact 38 which is positioned in a slot cut-out across the diameter of probe body 24. Contact pin 40 is formed of wire with a nickel and silver plating. Small compression spring 42 is positioned beneath lamp contact piece 34 to spring load the contact piece. Lamp contact piece 34 is formed on the tip of a cone-shaped piece on the bottom of the base of light bulb 32. When light bulb 32 is threaded into lamp socket 28, lamp contact piece 34 pushes down on the spring loaded socket contact 38, insuring electrical continuity and also insuring that contact is made in lamp socket 28 by pushing the threads of light bulb 32 against the threads in lamp socket 28.

The temperature measurement of the wall of tube 14 is obtained using an optical pyrometer system and measuring the color of the wall of tube 14 when heated and transmitting the light to the optical pyrometer system which translates the wavelength of the light reading into a temperature measurement. Two temperature measurements, one at the centerline of the 0.75 inch-wide tube support plate and one approximately 0.75 inch below the centerline (approximately 0.375 inch below the edge of the tube support plate) are required. Each measurement requires its own optical pyrometer system. Each system includes quartz prism 44 having a face 45° positioned in probe body 24. Quartz prism 44 receives the light emanating from the heated wall of tube 14 through windows 46 formed in probe body 24. The two quartz prisms 44 are separated by 0.75 inch so centerline and 0.75 inch below centerline temperature readings may be made simultaneously. Each quartz prism 44 is connected to fiber-optic cable 48 and partially shields the cable from heat. Light is reflected off the face 44° of quartz prism 44 45° angle and through fiber-optic cable 48. The cable transmits the light to an optical measuring device 50 which determines the color of the heated wall of tube 14, and optical pyrometer 52 which translates the optical color measurement into a temperature measurement. Optical measuring device 50 and optical pyrometer 52 are located in control station 74. The use of quartz prism 44 improves the accuracy and reliability of the temperature readings as compared with prior heater assemblies which did not use quartz prisms optically coupled to the ends of their fiber-optic cable. Two fifty foot lengths of fiber-optic cable 48 run from the optical pyrometer system through the length of heater probe assembly 20 to probe body 24. Fiber-optic cables 48 are disposed within a casing, and the top two inches of the casing around each cable 48 is stripped away and replaced with a stainless steel sleeve. The sleeve further protects cables 48 from heat, and a shoulder disposed on stainless steel sleeve allows cables 48 to be secured in probe body 24 without using additional screws or other fasteners.

The bottom portion of probe body 24, the portion containing quartz prisms 44 and fiber-optic cables 48 but not containing light bulb 32 or its connection to the probe body, is split in half and slots are machined into the flat surface of one of the halves to provide a housing in which fiber-optic cables 48 are disposed. Cut-outs and windows are machined into the two halves of probe body 24 to receive quartz prism 44 and the sleeve of fiber-optic cables 48. When the halves are put together using threaded coupling nut 53 which threads onto mating threads on the bottom of both halves of probe body 24, prisms 44 and the sleeve for cables 48 are physically captured in place by the geometry of the design of probe body 24.

Probe sleeve 54, preferably made from Inconel®, fits around probe body 24 and extends up around the circumference of light bulb 32 for approximately half the length of the bulb without covering the filament of the bulb 32. Probe sleeve 54 assists in holding the two halves of probe body 24 together. Additionally, probe sleeve 54 shields and strengthens light bulb 32 and its entire supporting assembly. The shielding function blocks the light from light bulb 32 from reflecting directly into fiber-optic cables 48 through quartz prisms 44 and thereby distorting the reading from the heated wall of tube 14. As the base of light bulb 32 is its weakest portion, probe sleeve 54 strengthens this area and supports bulb 32 by fitting around the bulb. Probe sleeve 54 is held in position by a pin protruding from probe body 24. The pin is positioned with a spring and set screw behind it and the pin protrudes from probe body 24 and fits into a hole in probe sleeve 54. If heater probe assembly 20 is designed so that probe sleeve 54 partially covers the area in which quartz prisms 44 are located, windows may be cut through the sleeve so that quartz prisms 44 have an unobstructed view of the walls of tube 14. Additionally, the top portion of probe sleeve 54 may be angled inwardly toward light bulb 32 and may have slots formed therein to provide some springiness so that probe sleeve 54 may expand or contract around light bulb 32. This permits probe sleeve 54 to hug light bulb 32 and prevents any edges from getting caught when heater probe assembly 20 is inserted into or removed from tube 14.

Eddy current bobbin assembly 56 is disposed in heater probe assembly 20 just below probe body 24. Eddy current bobbin assembly 56 is used to locate the centerline of tube support plates 16. Eddy current bobbin assembly 56 includes bobbin 58 having two grooves 60 formed around its outside diameter and having outer edges spaced approximately 0.75 inch apart. Copper wires 62 are wound in grooves 60 and terminate in cut-outs machined between the two grooves 60. A coaxial cable (not shown) is attached to copper wires 62 and runs throughout the length of heater probe assembly 20 to an electrical connector. Counterbore 64 is machined into the top of bobbin 58 and has three tapped holes around its circumference. The top of bobbin 58 mates with the bottom of coupling nut 53 and probe body 24. Probe body 24, coupling nut 53, and bobbin 58 are secured together using set screws 66. Bobbin 58 has axial holes 68 running therethrough to permit fiber-optic cables 48 and other wires extending from probe body 24 to pass therethrough. The bottom of bobbin 58 has a reduced diameter with three holes evenly spaced around the circumference, and flex hose assembly 70 slides over this reduced diameter portion and is secured to the bottom of bobbin 58. Flex hose assembly 70 is a flexible stainless steel braided hose which attaches to the bottom of bobbin 58 and provides flexibility between the straight section of probe body 24 and semi-rigid plastic conduit tube 22. The bottom of the flex hose can be formed with machined barbs which fit tightly within plastic conduit tube 22.

Plastic conduit tube 22, containing wires 36, wires 62, and fiber-optic cables 48, as well as a safety cable (not shown) extends to manifold box 72 as shown in FIG. 1, after passing end effector 73, which aligns probe 20 within tube 14. End effector 73 includes tool 73a and robotic arm 73b. The safety cable secures all of the sections together in the event something should break. Control station 74 is connected to manifold box 72 and processes the data collected by heater probe assembly 20 within tube 14. Probe pusher 76 assists in moving heater probe assembly 20 within tube 14.

Heater probe assembly 20 performs three primary functions. It supplies heat from a heat source such as light bulb 32 and power for that light source through wires 36 to heat the walls of tube 14. It makes temperature measurements of the wall of tube 14 using the optical pyrometer system. Finally, heater probe assembly 20 locates the centerline of tube support plates 16 with eddy current bobbin assembly 56 to permit proper location of probe body 24 within tube 14.

The process of using the heater probe assembly can be substantially the same as that described in previously mentioned U.S. patent application Ser. No. 069,721. The heater probe assembly is inserted into the heat exchanger tube and is actuated and oscillated between the limits of the heat treatment section which are typically between 100% and 300% of the thickness of the tube support plate surrounding the tubes. The distances among eddy current bobbin assembly 56, each quartz prism 44, and the center of the effective heating zone of light bulb 32 are known. First, using the eddy current sensing coils the centerline of the tube support plate is located. This centerline corresponds to the middle of the desired heat treatment zone. Then, the heat source is moved manually to the middle of the desired heat treatment section, the centerline of the tube support plate, for a first time interval. At the expiration of this time interval, the heat source is moved so the center of its effective heating zone is aligned with one of the ends of the tube portion for a second time interval. Next, the heat source is moved back into its initial position for a third time interval. Finally, the heat source is moved until the center of its effective heating zone is aligned with the other endpoint of the tube portion for a fourth time interval to complete a first oscillation. The process steps are repeated to effect subsequent oscillations. The movement of the heater probe during the oscillations of heating is performed manually. Windows 46, and therefore quartz prisms 44, are not adequately disposed within the desired heat treatment section. Therefore, once or twice during the heating process, the probe is moved upwardly a distance sufficient to align the upper quartz prism 44 with the centerline of the tube support plate and the lower quartz prism 44 0.75 inch below the centerline. This provides accurate simultaneous temperature measurements of the desired heat treatment section. The temperature at the other end of the heat treatment section, which is 0.75 inch above the centerline of the tube support plate, is substantially equal to that at the lower end of the heat treatment section and need not be separately measured. Alternately, quartz prisms 44 may be positioned to measure temperature at the top and middle portions of the heat treatment zone, the temperature at the lower end being equal to the temperature at the top end. The movement of heater probe assembly 20 to accommodate temperature measurements also is performed manually.

When the tube being treated is a section of an Inconel ® heat exchanger tube that is about 2 inches long and surrounded at its midportion by a 0.75 inch thick tube support plate, the heater probe assembly is chosen so that the heating zone is between 0.75 and 1.5 inches in length. Additionally, the time interval when the heating zone of the heater is aligned with the midportion of the tube surrounded by the support plate is substantially longer than the time intervals associated with the upper and lower limits of the oscillation. In a preferred embodiment of the process, the first and third time intervals are approximately two seconds long, while the second and fourth time intervals are about one second long. Additionally, the length of the tube section is selected to include all of the tubing between about 1 inch above and 1 inch below the centerline of the surrounding support plate. The entire process preferably takes about five minutes and the tube portion is heated to a range of 1250° F.-1600° F.

I claim:

1. A heater probe for heating a portion of a metallic conduit to within a selected temperature range, comprising:
    an elongated probe body having a first end and a second end, said elongated probe body being insertable into and slidably movable with respect to the conduit portion;
    heating means mounted on said first end of said probe body for heating the conduit portion to incandescence within the selected temperature range;
    temperature monitoring means for monitoring the temperature of the conduit portion; and
    first and second light conducting prism means for conducting the light of incandescence of the heated conduit portion to said temperature monitoring means, said first and second light conducting prism means being mounted on said second end of said probe body and spaced along the axis of said probe body such that said first and second light conducting prism means can simultaneously receive the light of incandescence from a middle and an end of said conduit portion.

2. A heater probe according to claim 1 wherein the conduit portion is at least partially surrounded by a metallic body, and said heater probe further comprises eddy current probe means for sensing the location of said metallic body around the conduit portion.

3. A heater probe according to claim 2 wherein the metallic body has a substantially uniform thickness relative to the longitudinal axis of the conduit portion, and said eddy current probe means comprises first and second sensing coils spaced along the longitudinal axis of said probe body at a distance substantially equal to the thickness of the metallic body.

4. A heater probe according to claim 1 wherein said heating means comprises an incandescent light bulb removably mounted on said first end of said probe body.

5. A heater probe according to claim 1 wherein said temperature monitoring means comprises optical measuring means for determining the color of the conduit portion and optical pyrometer means for translating the color reading into a temperature measurement.

6. A heater probe according to claim 1 wherein said probe body further comprises windows corresponding in location to the light receiving portions of said first and second light conducting prism means to permit said first and second light conducting prism means to conduct the light of incandescence to said temperature monitoring means.

7. A heater probe according to claim 1 further comprising probe sleeve means mounted on said probe body for further supporting said heating means on said probe body and preventing light from said heating means from reflecting into said first and second light conducting prism means.

8. A heater probe for heating a portion of a metallic tube that is surrounded at least in part by a metallic plate to within a selected temperature range, comprising:
    an elongated probe body having a first end and a second end, said elongated probe body being insertable into and slidably movable with respect to the tube portion;
    a radiant heat source comprising an incandescent light bulb mounted on said first end of said probe body which heats the tube portion to incandescence within the selected temperature range;
    temperature monitoring means for monitoring the temperature of the tube portion, said temperature monitoring means comprising optical measuring means for determining the color of the tube portion and optical pyrometer means for translating the optical color measurement of the tube portion into a temperature measurement;
    first and second prism means mounted within said probe body for conducting the light of incandescence of the heated tube portion to said optical pyrometer means, said prism means being spaced along the longitudinal axis of said probe body such that said first and second prism means can simultaneously receive the light of incandescence from a longitudinal middle and end of the tube portion as defined by a middle and an end of the metallic plate surrounding the tube portion; and
    first and second eddy current sensing coils mounted around said probe body for sensing the opposing edges of the metallic plate surrounding the tube portion, said coils being spaced along the longitudinal axis of said probe body at a distance substantially equal to the distance between opposing edges of the metallic plate.

9. A heater probe according to claim 8 wherein said probe body comprises windows corresponding in location to said first and second prism means for permitting said first and second prism means to conduct the light of incandescence to said temperature monitoring means.

10. A heater probe according to claim 9 further comprising probe sleeve means mounted on said probe body for further supporting said light bulb on said probe body and preventing light from said light bulb from reflecting into said first and second prism means.

11. A heater probe according to claim 10 further comprising control means associated with said second end of said probe body for monitoring the temperature of the tube portion and controlling the duration of the heating of the tube portion.

12. A heater probe according to claim 10 wherein said first and second prism means each comprise a quartz prism having a substantially 45° face.

13. A heater probe according to claim 10 wherein said temperature monitoring means comprises first and second temperature measuring devices which measure the temperature at the middle and end of the tube portion respectively.

14. A heater probe according to claim 10 wherein said temperature monitoring means further comprises a fiber-optic cable which connects said optical measuring means and said first and second prism means.

15. A heater probe assembly for heating a portion of a metallic steam generator tube that is surrounded at least in part by a metallic tube support plate to within a selected temperature range to thereby relieve stress in and prevent degradation of the tube portion at the location of the tube support plate, said heater probe assembly comprising:

an elongated probe body having a first end and a second end, said elongated probe body being insertable into and slidably movable with respect to the tube portion;

a radiant heat source comprising an incandescent high intensity light bulb that is removably mounted on said first end of said probe body which heats the tube portion to incandescence within the selected temperature range;

temperature monitoring means for monitoring the temperature of the tube portion, said temperature monitoring means comprising first and second optical measuring means for determining the color of the tube portion at its longitudinal middle and an end respectively, as defined by a middle and an end of the metallic tube support plate surrounding the tube portion, and optical pyrometer means for translating the optical color measurement into a temperature measurement;

first and second prisms, each having a substantially 45° face, which conduct the light of incandescence of the heated tube portion to said temperature monitoring means, said first and second prisms being spaced along the longitudinal axis of said probe body such that said first and second prisms can simultaneously receive the light of incandescence from the longitudinal middle and end, respectively, of the tube portion;

a fiber-optic cable which connects said first and second optical measuring means and said first and second prisms;

first and second eddy current sensing coils mounted around said probe body for sensing the opposing edges of the metallic tube support plate surrounding the tube portion, said coils being spaced along the longitudinal axis of said probe body at a distance substantially equal to the distance between the opposing edges of the metallic plate.

16. A heater probe assembly according to claim 15 further comprising a probe sleeve mounted on said probe body which further supports said light bulb on said probe body and prevents light from said light bulb from reflecting into said first and second prisms.

17. A heater probe assembly according to claim 16 wherein said probe body comprises windows corresponding in location to said first and second prisms to permit said first and second prisms to conduct the light of incandescence to said temperature monitoring means.

18. A heater probe assembly according to claim 17 wherein said probe sleeve comprises windows corresponding in location to said first and second prisms to permit said first and second prisms to conduct the light of incandescence to said temperature monitoring means.

19. A heater probe assembly according to claim 18 further comprising control means associated with said second end of said probe body for monitoring the temperature of the tube portion and controlling the duration of the heating of the tube portion.

20. A heater probe assembly according to claim 19 further comprising a tubular elongate member having first and second ends, said probe body being mounted on said first end of said elongate member and said control means being connected to said second end of said elongate member such that said control means is associated with said probe body through said elongate member.

21. A heater probe assembly according to claim 20 further comprising oscillating means for oscillating said probe body to thereby heat the entire tube portion to the selected temperature range.

22. A heater probe assembly according to claim 15 wherein said radiant heat source comprises a 1000 watt tungsten halogen lamp.

* * * * *